United States Patent [19]

Fujii et al.

[11] Patent Number: 4,584,120
[45] Date of Patent: Apr. 22, 1986

[54] LIQUID CRYSTAL COMPOUND AND LIQUID CRYSTAL COMPOSITION

[75] Inventors: Tsunenori Fujii; Kenji Suzuki, both of Souka; Masahiro Yoshida, Kita-Katsushika; Hisashi Okawa, Kasukabe; Kaoru Koto; Hideki Ohmori, both of Souka; Hisao Yokokura, Hitachi; Yoshiaki Okabe, Hitachi; Shintaroo Hattori, Hitachi; Teruo Kitamura, Katsuta; Akio Mukoh, Mito; Mikio Sato, Hitachi, all of Japan

[73] Assignee: Hitachi, Ltd., Tokyo, Japan

[21] Appl. No.: 610,439

[22] Filed: May 15, 1984

Related U.S. Application Data

[63] Continuation of Ser. No. 465,617, Feb. 10, 1983, abandoned.

[30] Foreign Application Priority Data

Feb. 15, 1982 [JP] Japan .................................. 57-21083

[51] Int. Cl.$^4$ ............................ G02F 1/13; C09K 3/34; C07C 69/75; C07C 69/753; C07C 69/773
[52] U.S. Cl. ............................ 252/299.63; 252/299.5; 252/299.66; 252/299.65; 252/299.67; 350/350 R; 350/350 S; 560/102; 560/118
[58] Field of Search .......... 252/299.63, 299.5, 299.66, 252/299.67, 299.65; 350/350 R, 350 S; 560/118, 102

[56] References Cited

U.S. PATENT DOCUMENTS

| | | | |
|---|---|---|---|
| 4,065,489 | 12/1977 | Steinstrasser et al. | 252/299.65 |
| 4,113,647 | 9/1978 | Coates et al. | 252/299.62 |
| 4,222,887 | 9/1980 | Matsufuji | 252/299.63 |
| 4,227,778 | 10/1980 | Raynes | 252/299.63 |
| 4,229,315 | 10/1980 | Krause et al. | 252/299.63 |
| 4,261,652 | 4/1981 | Grat et al. | 252/299.62 |
| 4,349,452 | 9/1982 | Osman et al. | 252/299.63 |
| 4,387,038 | 6/1983 | Fukui et al. | 252/299.63 |
| 4,387,039 | 6/1983 | Sugimori et al. | 252/299.63 |
| 4,438,268 | 3/1984 | Zaschke et al. | 252/299.62 |
| 4,462,924 | 7/1984 | Raynes | 252/299.66 |
| 4,510,069 | 4/1985 | Eidenschime et al. | 252/299.63 |
| 4,526,704 | 7/1985 | Petrzilka et al. | 252/299.63 |

FOREIGN PATENT DOCUMENTS

| | | | |
|---|---|---|---|
| 56501 | 7/1982 | European Pat. Off. | 252/299.61 |
| 87032 | 8/1983 | European Pat. Off. | 252/299.63 |
| 55-21429 | 2/1980 | Japan | 252/299.63 |
| 57-64645 | 4/1982 | Japan | 252/299.63 |
| 57-70839 | 5/1982 | Japan | 252/299.63 |
| 57-91953 | 6/1982 | Japan | 252/299.63 |
| 57-159743 | 10/1982 | Japan | 252/299.63 |
| 57-209252 | 12/1982 | Japan | 252/299.63 |
| 58-13546 | 1/1983 | Japan | 252/299.63 |
| 58-55447 | 4/1983 | Japan | 252/299.63 |

OTHER PUBLICATIONS

Gray, G. W., Mol. Cryst. Liq. Cryst., vol. 63, pp. 3–18 (1981).
Gray, G. W., et al., Liquid Crystals & Plastic Crystals, vol. 1, pp. 125–136 (1974).

*Primary Examiner*—Teddy S. Gron
*Attorney, Agent, or Firm*—Antonelli, Terry & Wands

[57] ABSTRACT

The liquid crystal compound of this invention is characterized by having the general formula.

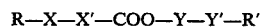

wherein R and R' each represent an alkyl group, and X, X', Y and Y' each represent

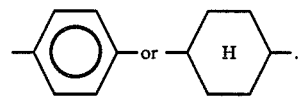

13 Claims, 1 Drawing Figure

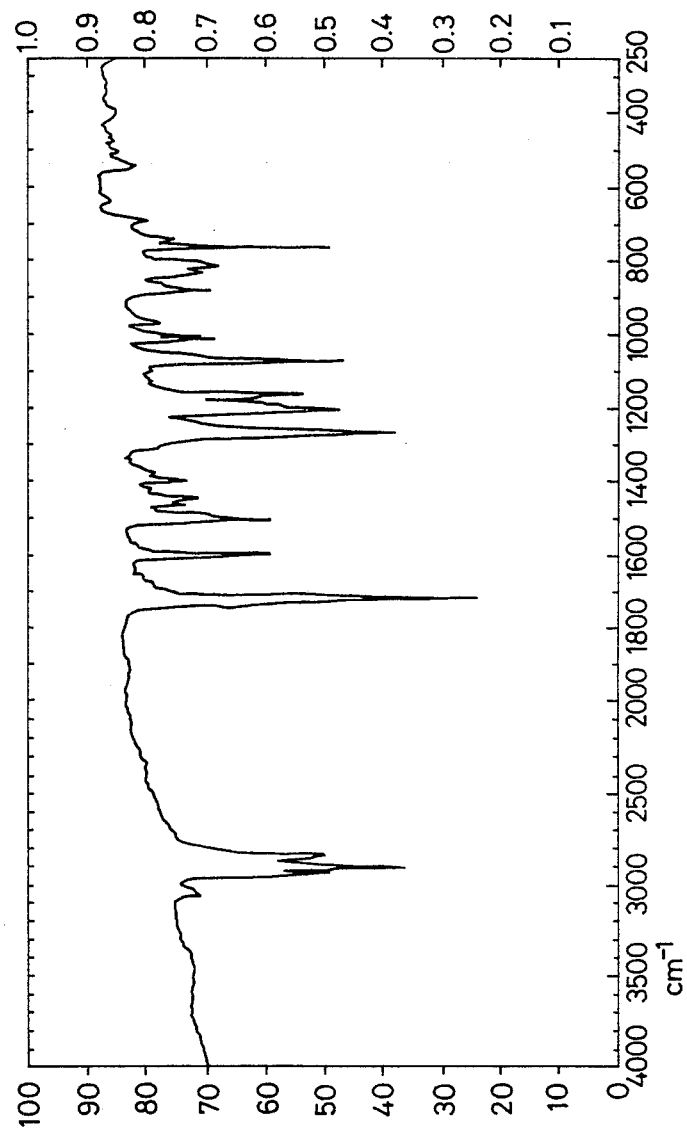

LIQUID CRYSTAL COMPOUND AND LIQUID CRYSTAL COMPOSITION

This is a continuation of application Ser. No. 465,617, filed Feb. 10, 1983, now abandoned.

FIELD OF THE INVENTION

The present invention relates to a liquid crystal compound and a liquid crystal composition containing the liquid crystal compound.

BACKGROUND OF THE INVENTION

The term "liquid crystal compound" herein include also compound which do not exhibit a liquid crystal phase by themselves but are useful as a component of liquid crystal compositions.

The term "phase transition temperature" means a temperature range of a nematic phase about the liquid crystal compound, and the term "liquid crystal temperature range" means a temperature range of a nematic phase about the liquid crystal composition.

Display means made of nematic liquid crystals have been used practically in the fields of wrist-watches and desk computers. There has been proposed an idea of using a display means for the display of gauge panelboards of automobiles. As well known, such panelboards should be resistant to a broad range of temperatures ranging from those of cold districts to those of the tropics. It is now required to obtain a liquid crystal composition which works at a broad liquid crystal temperature range of from $-30°$ C. to $80°$ C.

Liquid crystal composition practically used comprise generally mixtures of several liquid crystal compounds. These liquid crystal compositions exhibit characteristic properties of the respective liquid crystal compounds and they exhibit satisfactory properties required.

As one of the liquid crystal compound, the following compound has been known.

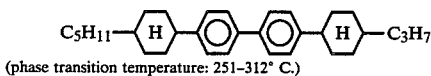

(phase transition temperature: 251-312° C.)

This compound is used for elevating the upper limit in the liquid crystal temperature range (i.e. a temperature at which the transition from the nematic phase to isotropic liquid occurs) so as to broaden the liquid crystal temperature range of a liquid crystal composition. However, as the amount of the polycyclic liquid crystal compound is increased, the viscosity and the lower limit of the liquid crystal temperature range (temperature at which the crystalline phase is converted into a nematic phase) are elevated significantly and undesirably.

SUMMARY OF THE INVENTION

An object of the present invention is to provide a liquid crystal compound having the upper limit of the liquid crystal temperature elevated without elevating viscosity and a lower limit of a liquid crystal composition containing the liquid crystal compound and the liquid crystal composition.

The inventors made investigations of the compatibility and molecular structures for the purpose of broadening the range of the phase transition temperature. After the investigating, the inventors have found that if an ester group having a high polarizability effect is introduced in the center of the polycyclic liquid crystalline compound, the intermolecular interaction is accelerated to form the liqud crystal easily. The present invention has been attained on the basis of this finding.

The liquid crystal compound of the present invention is characterized by having the general formula:

R—X—X′—COO—Y—Y′—R′ wherein R and R′ each represent an alkyl group, and X, X′, Y and Y′ each represent

 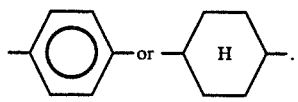

These compounds are colorless and chemically stable.

The liquid crystal compound of the present invention can be synthesized from commercially available reagents by known methods. Embodiments of the synthesis according to the esterification reaction are as shown below:

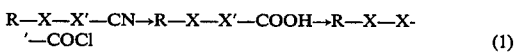  (1)

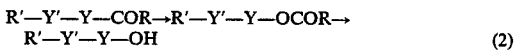  (2)

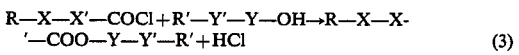  (3)

The liquid crystal composition of the present invention is characterized by containing the liquid crystal compound of the invention as one of the components thereof.

BRIEF DESCRIPTION OF THE DRAWINGS

The FIGURE shows an infrared absorption spectrum of a liquid crystal compound in an embodiment of the present invention.

PREFERRED EMBODIMENTS OF THE INVENTION

The following examples will further illustrate the present invention.

To 22 g of

and 50 ml of ethyl alcohol a solution of 25 g of potassium hydroxide in 15 ml of water was added, and refluxed for 8 h. The reaction mixture was poured in water and made acidic with HCl to obtain precipitates. The precipitates were recrystallized from benzene to obtain

100 g of thionyl chloride was added dropwise to 30 g of the obtained

under cooling with ice. After refluxing for 4 h, the excess thionyl chloride was distilled off to obtain

195 g of anhydrous aluminum chloride was dissolved in 1.5 l of methylene chloride and cooled in an ice bath in another flask 100 g of

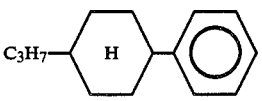

was added. Then, 79 g of acetyl chloride was added dropwise to the stirred and cooled solution. After the mixture was stood at room temperature for 6 h, it was poured in 1 l of dilute hydrochloric acid. The methylene chloride layer was separated off, dried and the solvent was distilled off. After distillation under reduced pressure,

was obtained. 70 g of

was mixed with 620 ml of 88% formic acid by stirring. Then, 310 ml of acetic anhydride, 4 ml of concentrated sulfuric acid and 110 ml of a hydrogen peroxide solution (35%) were added dropwise to the mixture in this order. The mixture was stirred at 40°–50° C. for 8 h and the mixture was poured in water. An oil thus separated was extracted with benzene and the solvent was removed. To the residue, 100 ml of methanol and 250 ml of a 2 N aqueous sodium hydroxide solution were added and refluxed for 2 h. After cooling, the mixture was made acidic with hydrochloric acid. The precipitate were extracted with benzene. Benzene was distilled off and the crystals were recrystallized to obtain

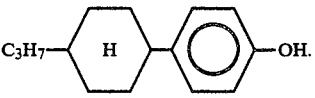

8 g of

in 60 ml benzene was added dropwise while stirring to 7 g of

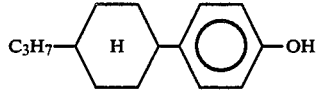

in 10 ml pyridine. The mixture was refluxed for 2 h and washed with water. Benzene was distilled off and the residue was recrystallized from acetone to obtain the intended product.

The infrared absorption spectrum of the compound obtained as above is shown in an attached figure. In the figure, an absorption due to the ester is observed at 1750 cm$^{-1}$. In a mass spectrum, it was recognized that a molecule ion peak appears at m/e 440. From these two facts and the starting materials, it was recognized that the compound thus synthesized was p-(trans-4-propylcyclohexyl)phenyl 4'-propylbiphenyl-4''-carboxylate of the following formula:

The phase transition temperature of this compound was 120°–330° C.

The following compounds may be synthesized in the same manner as above:

(1) p-(trans-4-propylcyclohexyl)phenyl 4'-butyl-biphenyl-4''-carboxylate,
(2) p-(trans-4-propylcyclohexyl)phenyl 4'-pentyl-biphenyl-4''-carboxylate,
(3) p-(trans-4-propylcyclohexyl)phenyl 4'-heptyl-biphenyl-4''-carboxylate,
(4) p-(trans-4-propylcyclohexyl)phenyl 4'-octyl-biphenyl-4''-carboxylate,
(5) p-(trans-4-butylcyclohexyl)phenyl 4'-butyl-biphenyl-4''-carboxylate,
(6) p-(trans-4-butylcyclohexyl)phenyl 4'pentyl-biphenyl-4''-carboxylate,
(7) p-(trans-4-butylcyclohexyl)phenyl 4'-heptyl-biphenyl-4''-carboxylate,
(8) p-(trans-4-butylcyclohexyl)phenyl 4'-octyl-biphenyl-4''-carboxylate,
(9) p-(trans-4-pentylcyclohexyl)phenyl 4'-butyl-biphenyl-4''-carboxylate,
(10) p-(trans-4-pentylcyclohexyl)phenyl 4'pentyl-biphenyl-4''-carboxylate,
(11) p-(trans-4-pentylcyclohexyl)phenyl 4'-heptyl-biphenyl-4''-carboxylate,
(12) p-(trans-4-pentylcyclohexyl)phenyl 4'-octyl-biphenyl-4''-carboxylate,
(13) p-(trans-4-heptylcyclohexyl)phenyl 4'butyl-biphenyl-4''carboxylate,
(14) p-(trans-4-heptylcyclohexyl)phenyl 4'-pentyl-biphenyl-4''-carboxylate,
(15) p-(trans-4-heptylcyclohexyl)phenyl 4'-heptyl-biphenyl-4''-carboxylate,

(16) p-(trans-4-heptylcyclohexyl)phenyl 4'-octyl-biphenyl-4"-carboxylate,
(17) p-(trans-4-octylcyclohexyl)phenyl 4'-butyl-biphenyl-4"-carboxylate,
(18) p-(trans-4-octylcyclophexyl)phenyl 4'-pentyl-biphenyl-4"-carboxylate,
(19) p-(trans-4-oxtylcyclohexyl)phenyl 4'-heptyl-biphenyl-4"-carboxylate,
(20) p-(trans-4-octylcyclohexyl)phenyl 4'-octyl-biphenyl-4"-carboxylate,
(21) p-(trans-4-propylcyclohexyl)phenyl 4'-hexyl-biphenyl-4"-carboxylate,
(22) p-(trans-4-butylcyclohexyl)phenyl 4'-propyl-biphenyl-4"-carboxylate,
(23) p-(trans-4-butylcyclohexyl)phenyl 4'-hexyl-biphenyl-4"-carboxylate,
(24) p-(trans-4-pentylcyclohexyl)phenyl 4'-propyl-biphenyl-4"-carboxylate,
(25) p-(trans-4-pentylcyclohexyl)phenyl 4'-hexyl-biphenyl-4"-carboxylate,
(26) p-(trans-4-hexylcyclohexyl)phenyl 4'-propyl-biphenyl-4"-carboxylate.
(27) p-(trans-4-hexylcyclohexyl)phenyl 4'-butyl-biphenyl-4"-carboxylate,
(28) p-(trans-4-hexylcyclohexyl)phenyl 4'-pentyl-biphenyl-4"-carboxylate,
(29) p-(trans-4-hexylcyclohexyl)phenyl 4'-hexyl-biphenyl-4"-carboxylate,
(30) p-(trans-4-hexylcyclohexyl)phenyl 4'-heptyl-biphenyl-4"-carboxylate,
(31) p-(trans-4-hexylcyclohexyl)phenyl 4'-octyl-biphenyl-4"-carboxylate,
(32) p-(trans-4-hexylcyclohexyl)phenyl 4'-propyl-biphenyl-4"-carboxylate,
(33) p-(trans-4-heptylcyclohexyl)phenyl 4'-hexyl-biphenyl-4"-carboxylate,
(34) p-(trans-4-octylcyclohexyl)phenyl 4'-propyl-biphenyl-4"-carboxylate,
(35) p-(trans-4-octylcyclohexyl)phenyl 4'-hexyl-biphenyl-4"-carboxylate.

Further, other compounds of the above general formula can be synthesized in the same manner as above.

EXAMPLE 2

A 60% solution of 8 g of

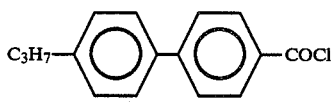

and 6.6 g of

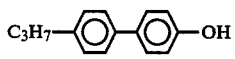

obtained in the same manner as in Example 1 in benzene and 18 g of pyridine were charged in a flask. The mixture was refluxed for 5 h and washed with water. Benzene was distilled off and the residue was recrystallized from acetone to obtain an intended product.

In an infrared absorption spectrum of the compound obtained above, an absorption due to ester was observed at 1750 cm$^{-1}$. In the mass spectrum, a molecular ion peak appeared at m/e434. From the relationship between these two facts and the starting compounds, it was recognized that the compound thus synthesized was 4-propylbiphenyl 4'-propyl-biphenylcarboxylate of the following formula:

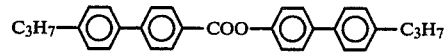

The transition temperature of this compound was 199°–340° C.

EXAMPLE 3

An 80% solution of 8 g of

and 8.1 g of

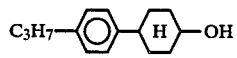

in benzene and 25 g of pyridine were charged in a flask. The mixture was refluxed for 12 h and washed with water. Benzene was distilled off and the residue was recrystallized from acetone to obtain an intended product.

In an infrared absorption spectrum of the compound obtained above, an absorption due to ester was observed at 1755 cm$^{-1}$. In the mass spectrum, a molecular ion peak appeared at m/e 440. From the relationship between these two facts and the starting compounds, it was recognized that the compound thus synthesized was trans-4-(p-propylphenyl)cyclohexyl4'-propylbiphenyl-4"-carboxylate of the following formula:

The transition temperature of this compound was 202°–293° C.

EXAMPLE 4

A 20% solution of 8 g of

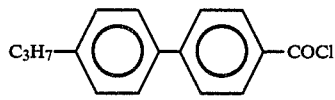

and 9 g of

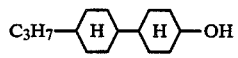

in benzene and 12 g of pyridine were charged in a flask. The mixture was refluxed for 16 h and washed with water. Benzene was distilled off and the residue was recrystallized from acetone to obtain an intended product.

In an infrared absorption spectrum of the compound obtained above, an absorption due to ester was observed at 1755 cm$^{-1}$. In the mass spectrum, a molecular ion peak appeared at m/e 446. From the relationship between these two facts and the starting compounds, it was recognized that the compound thus synthesized was trans, trans-4-propylbicyclohexane-4'-yl 4''-propylbiphenyl-4'''-carboxylate of the following formula:

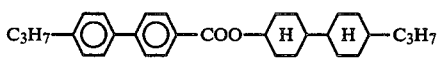

EXAMPLE 5

A 50% solution of 8.2 g of

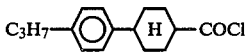

and 6.6 g of

in benzene and 20 g of pyridine were charged in a flask. The mixture was refluxed for 5 h and washed with water. Benzene was distilled off and the residue was recrystallized from acetone to obtain an intended product.

In an infrared absorption spectrum of the compound obtained above, an absorption due to ester was observed at 1740 cm$^{-1}$. In the mass spectrum, a molecular ion peak appeared at m/e 440. Form the relationship between these two facts and the starting compounds, it was recognized that the compound thus synthesized was 4-propylbiphenyl-4'-yl trans-4-(p-propylphenyl)cyclohexanecarboxylate of the following formula:

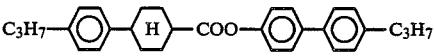

EXAMPLE 6

A 30% solution of 8.2 g of

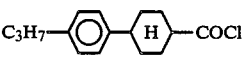

and 7.4 g of

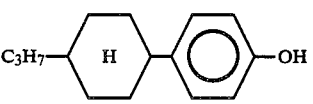

in benzene and 15 g of pyridine were charged in a flask. The mixture was refluxed for 2 h and washed with water. Benzine was distilled off and the residue was recrystallized from hexane to obtain an intended product.

In an infrared absorption spectrum of the compound obtained above, an absorption due to ester was observed at 1745 cm$^{-1}$. In the mass spectrum, a molecular ion peak appeared at m/e 446. From the relationship between these two facts and the starting compounds, it was recognized that the compound thus synthesized was p-(trans-4-propylcyclohexyl)phenyl trans-4'-(p'-propylphenyl)cyclohexane-carboxylate of the following formula:

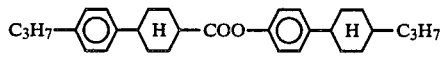

This compound had a phase transition temperature of 179° to 283° C.

EXAMPLE 7

A 50% solution of 8.2 g of

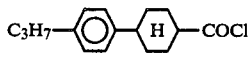

and 8.1 g of

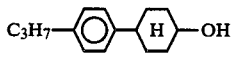

in benzene and 30 g of pyridine were charged in a flask. The mixture was refluxed for 12 h and washed with water. Benzene was distilled off and the residue was recrystallized from acetone to obtain an intended product.

In an infrared absorption spectrum of the compound obtained above, an absorption due to ester was observed at 1750 cm$^{-1}$. In the mass spectrum, a molecular ion peak appeared at m/e 446. From the relationship between these two facts and the starting compounds, it was recognized that the compound thus synthesized was trans-4-(p-propylphenyl)cyclohexyl trans-4'-(p'-propylphenyl)cyclohexanecarboxylate of the following formula:

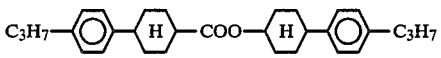

EXAMPLE 8

A 50% solution of 8.2 g of

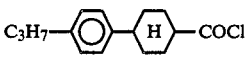

and 8.3 g of

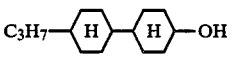

in benzene and 20 g of pyridine were charged in a flask. The mixture was refluxed for 15 h and washed with water. Benzene was distilled off and the residue was recrystallized from acetone to obtain an intended product.

In an infrared absorption spectrum of the compound obtained above, an absorption due to ester was observed at 1740 cm$^{-1}$. In the mass spectrum, a molecular ion peak appeared at m/e 452. From the relationship between these two facts and the starting compounds, it was recognized that the compound thus synthesized was trans, trans-4-propylbicyclohexane-4'-yl trans-4''-(p-propylphenyl)-cyclohexane-carboxylate of the following formula:

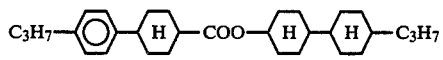

EXAMPLE 9

A 30% solution of 8.2 g of

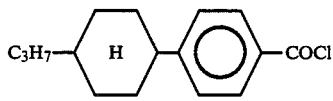

and 6.6 g of

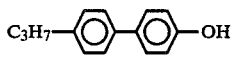

in benzene and 15 g of pyridine were charged in a flask. The mixture was refluxed for 6 h and washed with water. Benzene was distilled off and the residue was recrystallized from ethanol to obtain an intended product.

In an infrared absorption spectrum of the compound obtained above, an absorption due to ester was observed at 1745 cm$^{-1}$. In the mass spectrum, a molecular ion peak appeared at m/e 440. From the relationship between these two facts and the starting compounds, it was recognized that the compound thus synthesized was 4-propylbiphenyl-4'-yl p-(trans-4-propylcyclohexyl)benzoate of the following formula:

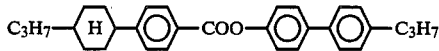

This compound had a phase transition temperature of 133° to 327° C.

EXAMPLE 10

A 20% solution of 8.2 g of

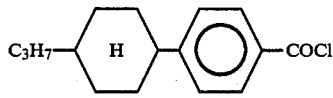

and 7.4 g of

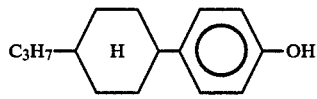

in benzene and 20 g of pyridine were charged in a flask. The mixture was refluxed for 4 h and washed with water. Benzene was distilled off and the residue was recrystallized from ethanol to obtain an intended product.

In an infrared absorption spectrum of the compound obtained above, an absorption due to ester was observed at 1740 cm$^{-1}$. In the mass spectrum, a molecular ion peak appeared at m/e 446. From the relationship between these two facts and the starting compounds, it was recognized that the compound thus synthesized was p-(trans-4-propylcyclohexyl)phenyl p'-(trans-4'-propylcyclohexyl)benzoate of the following formula:

This compound had a phase transition temperature of 174° to 325° C.

EXAMPLE 11

A 30% solution of 8.2 g of

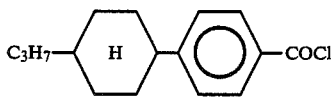

and 8.1 g of

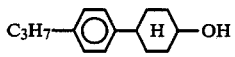

in benzene and 20 g of pyridine were charged in a flask. The mixture was refluxed for 8 h and washed with water. Benzene was distilled off and the residue was recrystallized from ethanol to obtain an intended product.

In an infrared absorption spectrum of the compound obtained above, an absorption due to ester was observed at 1735 cm$^{-1}$. In the mass spectrum, a molecular ion peak appeared at m/e 446. From the relationship between these two facts and the starting compounds, it was recognized that the compound thus synthesized was trans-4-(p-propylphenyl)cyclohexyl p-(trans-4'-propylcyclohexyl)-benzoate of the following formula:

EXAMPLE 12

A 50% solution of 8.2 g of

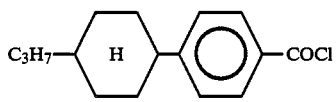

and 8.3 g of

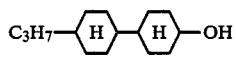

in benzene and 30 g of pyridine were charged in a flask. The mixture was refluxed for 12 h and washed with water. Benzene was distilled off and the residue was recrystallized from ethanol to obtain an intended product.

In an infrared absorption spectrum of the compound obtained above, an absorption due to ester was observed at 1730 cm$^{-1}$. In the mass spectrum, a molecular ion peak appeared at m/e 452. From the relationship between these two facts and the starting compounds, it was recognized that the compound thus synthesized was trans, trans-4-propylbicyclohexane-4'-yl p-(trans-4''-propylcyclohexyl)-benzoate of the following formula:

EXAMPLE 13

A 30% solution of 8.4 g of

and 6.6 g of

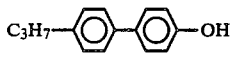

in benzene and 20 g of pyridine were charged in a flask. The mixture was refluxed for 6 h and washed with water. Benzene was distilled off and the residue was recrystallized from hexane to obtain an intended product.

In an infrared absorption spectrum of the compound obtained above, an absorption due to ester was observed at 1740 cm$^{-1}$. In the mass spectrum, a molecular ion peak appeared at m/e 446. From the relationship between these two facts and the starting compounds, it was recognized that the compound thus synthesized was 4-propylbiphenyl-4'-yl trans, trans-4''-propylbicyclohexane-4'''-carboxylate of the following formula:

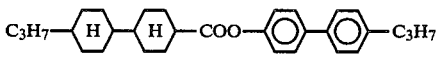

This compound had a phase transition temperature of 223° to 318° C.

EXAMPLE 14

A 20% solution of 8.4 g of

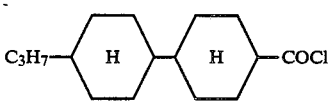

and 7.4 g of

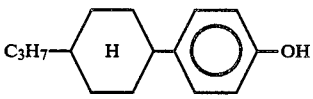

in benzene and 15 g of pyridine were charged in a flask. The mixture was refluxed for 10 h and washed with water. Benzene was distilled off and the residue was recrystallized from hexane to obtain an intended product.

In an infrared absorption spectrum of the compound obtained above, an absorption due to ester was observed at 1750 cm$^{-1}$. In the mass spectrum, a molecular ion peak appeared at m/e 452. From the relationship between these two facts and the starting compounds, it was recognized that the compound thus synthesized was p-(trans-4-propylcyclohexyl)phenyl trans, trans-4'-propylbicyclohexane-4''-carboxylate of the following formula:

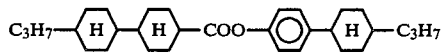

This compound had a phase transition temperature of 208° to 318° C.

EXAMPLE 15

A 50% solution of 8.4 g of

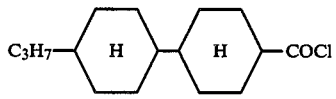

and 8.1 g of

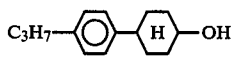

in benzene and 30 g of pyridine were charged in a flask. The mixture was refluxed for 15 h and washed with water. Benzene was distilled off and the residue was recrystallized from hexane to obtain an intended product.

In an absorption spectrum of the compound obtained above, an absorption due to ester was observed at 1730 cm$^{-1}$. In the mass spectrum, a molecular ion peak appeared at m/e 452. From the relationship between these two facts and the starting compounds, it was recognized that the compound thus synthesized was trans-4-(p-propylphenyl)cyclohexyl trans, trans-4'-propylbicyclohexane-4''-carboxylate of the following formula:

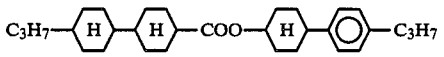

EXAMPLE 16

A 40% solution of 8.4 g of

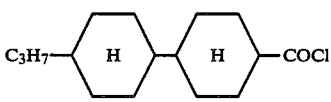

and 7.7 g of

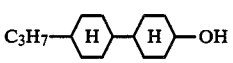

in benzene and 25 g of pyridine were charged in a flask. The mixture was refluxed for 18 h and washed with water. Benzene was distilled off and the residue was recrystallized from hexane to obtain an intended product.

In an infrared absorption spectrum of the compound obtained above, an absorption due to ester was observed at 1745 cm$^{-1}$. In the mass spectrum, a molecular ion peak appeared at m/e 458. From the relationship between these two facts and the starting compounds, it was recognized that the compound thus synthesized was trans, trans-4-propylbicyclohexane-4'-yl trans'-trans-4"-propylbicyclohexane-4'''-carboxylate of the following formula:

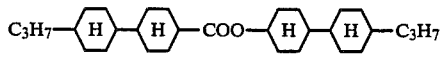

EXAMPLE 17

The liquid crystal compound prepared in Example 1 was added to known liquid crystal compounds, i.e. mixture A (comprising

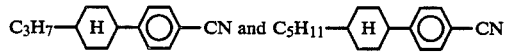

in a ratio of 50:50 wt %) and mixture B (comprising

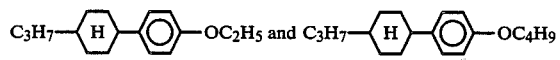

in a ratio of 50:50 wt %) and liquid crystal temperature ranges and viscosities of them were examined. The results are shown in the following table. As shown in the table, the liquid crystal compositions in this example had a liquid crystal temperature range remarkably broadened by about 30° to 60° C. as compared with A and B, while the increase in viscosity was as small as about 6 to 11 CP.

TABLE 1

| Known liquid crystal | Synthetic compound | Amount (wt %) | Liquid crystal temp. range | Viscosity (cp) at 30° C. |
| --- | --- | --- | --- | --- |
| A | — | — | 10~50 | 20 |
|   | C$_3$H$_7$—◯—◯—COO—◯—H—C$_3$H$_7$ | 10 | 12~83 | 25 |
|   |   | 20 | 15~114 | 30 |
|   | (Comparative) C$_5$H$_{11}$—H—◯—◯—H—C$_3$H$_7$ | 10 | 28~79 | 28 |
|   |   | 20 | precipitated | — |
| B | — | — | 20~35 | 10 |
|   | C$_3$H$_7$—◯—◯—COO—◯—H—C$_3$H$_7$ | 10 | 23~68 | 17 |
|   |   | 20 | 26~97 | 21 |
|   | (Comparative) C$_5$H$_{11}$—H—◯—◯—H—C$_3$H$_7$ | 10 | 38~62 | — |
|   |   | 20 | precipitated | — |

EXAMPLE 18

20 wt % of the liquid crystal compound shown in Example 1 was added to the matrix liquid crystal B shown in Example 17. A TN-type liquid crystal device was prepared by using the mixture as a liquid crystal layer. The liquid crystal device comprised upper and lower glass substrates, a transparent NESA electrode formed on the inner surface of each of the glass substrates and an orientation-control film made of a polymide compound so as to orient the liquid crystal molecules. A gap between the upper and lower substrates was controlled so that the thickness of the liquid crystal layer would be about 10 μm. A voltage of 6 V was applied to the liquid crystal display device at an ambient temperature of −30° C. Response time was 1.7 sec. A liquid crystal display device in which the liquid crystal layer comprised only the matrix liquid crystal B had a response time of 3.6 sec under the same condition as above.

As described above in detail, if the liquid crystal compounds of the present invention are used, the liquid crystal temperature range can be broadened remarkably and particularly the upper limit of the temperature can be raised without increasing viscosity of the liquid crystal composition significantly. If the liquid crystal compositions containing these compounds are used, the response of liquid crystal display devices can be improved.

What is claimed is:

1. A liquid crystal compound characterized by having the general formula:

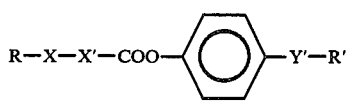

wherein R and R' each represent an alkyl group, —X—X'— is selected from the group consisting of

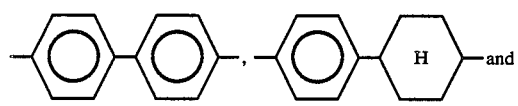

and Y' is selected from the group consisting of

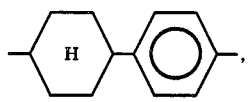

2. A liquid crystal compound according to claim 1 characterized in that the alkyl group has 1 to 8 carbon atoms.

3. A liquid crystal composition characterized by containing a mixture of liquid crystal compounds at least one of which is a liquid crystal compound of the general formula:

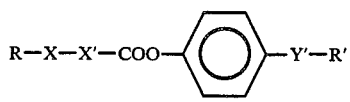

wherein R and R' each represent an alkyl group, —X—X' is selected from the group consisting of

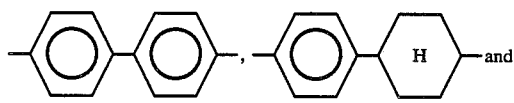

and Y is selected from the group consisting of

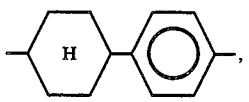

4. A liquid crystal compound according to claim 1; namely,

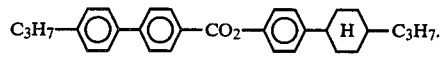

5. A liquid crystal compound according to claim 1; namely,

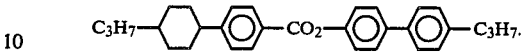

6. A liquid crystal compound according to claim 1; namely,

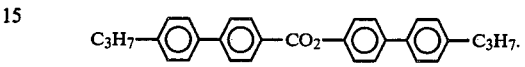

7. A liquid crystal compound according to claim 1; namely,

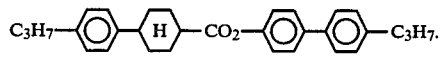

8. A liquid crystal compound according to claim 1; namely,

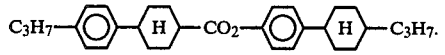

9. A liquid crystal composition according to claim 3, wherein said liquid crystal compound of the general formula is

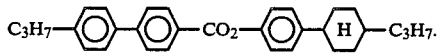

10. A liquid crystal composition according to claim 3, wherein said liquid crystal compound of the general formula is

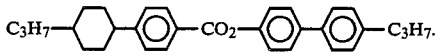

11. A liquid crystal composition according to claim 3, wherein said liquid crystal compound of the general formula is

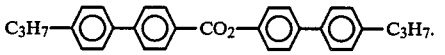

12. A liquid crystal composition according to claim 3, wherein said liquid crystal compound of the general formula is

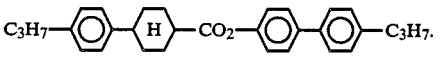

13. A liquid crystal composition according to claim 3, wherein said liquid crystal compound of the general formula is

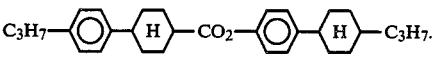

* * * * *